Aug. 23, 1932.  L. E. LA BRIE  1,872,983
VEHICLE WHEEL
Filed Nov. 6, 1924
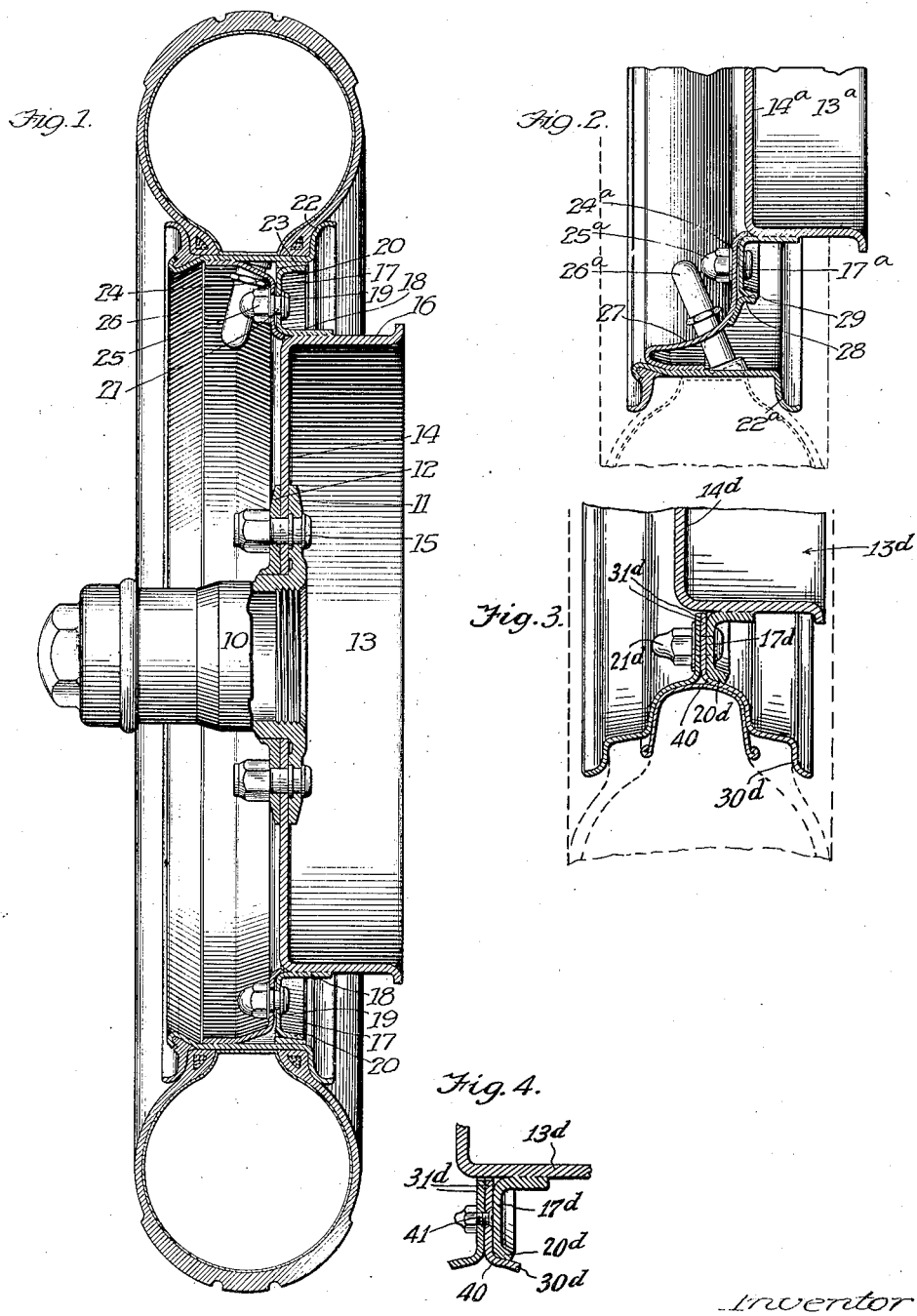
Witness
Martin H. Olsen.
Inventor
Ludger E. LaBrie
By Cromwell, Greist & Warden
Attys Patented Aug. 23, 1932

1,872,983

UNITED STATES PATENT OFFICE

LUDGER E. LA BRIE, OF CHICAGO, ILLINOIS, ASSIGNOR, BY MESNE ASSIGNMENTS, TO BENDIX BRAKE COMPANY, OF CHICAGO, ILLINOIS, A CORPORATION OF ILLINOIS

VEHICLE WHEEL

Application filed November 6, 1924. Serial No. 748,018.

Heretofore it has been generally thought that a complete wheel structure equipped for direct braking must include, as the essential divisions thereof, a central hub, an intermediate body, a peripheral rim, and a brake drum. This is evident from the vast number of related improvements which of late years have been directed without exception to features in each of the aforesaid divisions. The wheel structure of the present invention is a revolutionary departure from past structures, however, in that the customary intermediate body of wooden artillery spoke, wire spoke, or disk formation is advantageously eliminated by a novel arrangement of the brake drum with respect to the hub and rim.

The principal object of the invention is to provide an improved wheel structure whereby the brake drum or its equivalent constitutes the main support for the tire rim.

Other objects and advantages of the invention will be evident upon a full understanding of the construction of the wheel.

In order that the invention may be fully understood, several preferred embodiments of the same are presented in the accompanying drawing and in the following detailed description predicated thereon, but it will be appreciated that such embodiments are chosen primarily for the purpose of exemplification and are not to be construed as unnecessarily limiting in any respect the comprehensive scope of the appended claims.

In the drawing,

Fig. 1 is a section taken through a wheel which embodies one form of the invention;

Figs. 2 and 3 are similar but framentary sections showing other forms of the invention;

Fig. 4 is a section taken at another point from Fig. 3 but through the same wheel.

The wheel illustrated in Fig. 1 includes a hub 10 having a fixed flange 11 and a removable ring 12; a brake drum 13 having a centrally apertured plate 14 secured by bolts 15 of the hub between the flange 11 and the ring 12, a brake-engaging flange 16 extending rearwardly from the periphery of the plate 14, a flanged ring 17 extending from the front of the flange 16 first forwardly and outwardly at 18, then outwardly at 19, and then outwardly and rearwardly at 20, and a plurality of bolts 21 extending forwardly from the ring 17 at 19; and a tire rim 22 having a rear seat 23 extending outwardly and rearwardly for wedging engagement with the ring 17 at 20, a flanged ring 24 apertured for the passage of the bolts 21 and extending from the rim first inwardly in slightly spaced relation to the ring 17 at 19 and then rearwardly and inwardly in wedging engagement with the ring 17 at 18, and a plurality of nuts 25 in adjustable engagement with the bolts 21. The radially lapping rings 17 and 24 may be permanently secured respectively to the drum 13 and rim 22 in any suitable manner, as by welding.

In the first form of the invention, as in the other form hereinafter described, the rim is supported solely upon the brake drum, and the ordinary body of spoke or disk formation is dispensed with. If the flanged ring 24 of the rim extends inwardly at a point sufficiently to the rear of the center line of the rim, the usual valve stem 26 may be employed, but, if the ring extends inwardly at a point closely adjacent such center line, the valve stem may be positioned obliquely, as in Fig. 1.

The wheel illustrated in Fig. 2 is designed to permit of the novel association of the invention between the drum and the rim in those instances where it is expedient that a greater difference exist between the radial dimensions of the drum and rim than that illustrated in Fig. 1. In order to compensate for such increased space between the drum and the rim, the ring $24^a$ may be made of greater width with a resilient curved portion 27 interposed if desired between the attaching portion thereof already described and the rim, and the ring $24^a$ may be provided, inwardly of the portion 27, with a rearwardly and outwardly extending flange 28 having a seat 29 to bear against the ring $17^a$ at 20 in lieu of the seat 23 on the rim.

The wheel illustrated in Figs. 3 and 4 embodies the novel association as between the drum $13^d$ and a drop-base rim $30^d$. The flanges $31^d$ of the rim, instead of being clamped directly to the drum, are clamped against the flanged ring 17ᵈ on the drum, and the inclined seat 40 presented by the rim is in wedging engagement with the ring 17ᵈ at the correspondingly inclined portion 20ᵈ thereof. The rim 30ᵈ is adjustably drawn up against the ring 17ᵈ by the bolts 21ᵈ, and the two flanges 31ᵈ of the rim are held together when off the drum by means of other bolts 41.

I claim:

1. A vehicle wheel comprising, in comination, a brake drum, a tire rim, two rings secured respectively to the drum and rim and disposed in radially lapping relation to each other, and means for detachably clamping the rings together to support the rim upon the drum.

2. A vehicle wheel comprising, in combination, a brake drum, a U-shaped ring permanently secured to the drum, a tire rim, a ring having a flange at the outer periphery thereof permanently secured to the rim, and means associated with the rings for detachably mounting the rim upon the drum.

3. A vehicle wheel comprising, in combination, a brake drum, a ring permanently secured to the drum adjacent the periphery thereof, a plurality of rim securing bolts carried by the ring at intervals about the circumference thereof, a tire rim, a ring permanently secured to the rim and apertured at intervals to receive the bolts, and nuts on the bolts for clamping the rings together.

4. A vehicle wheel comprising, in combination, a brake drum, a tire rim, and an interposed ring carried by the rim and detachably secured to an extension upon the drum, said ring being dished inwardly and rearwardly from the rim to the drum.

5. A vehicle wheel comprising a wheel body, a double flanged ring secured to said body by means of one of said flanges, said flanges being angularly arranged relatively to each other, a rim associated with said ring, said rim having a radially extending web provided with flanges adapted to cooperate with those carried by the wheel body and with additional securing means to secure the rim to the wheel body.

6. A vehicle wheel comprising a wheel body, a double flanged ring secured to said body by means of one of said flanges, said flanges being angularly arranged relatively to each other, a rim associated with said ring, said rim having a radially extending web provided with flanges adapted to cooperate with those carried by the wheel body to secure the rim to the wheel body, and means extending through said web and said ring for securing the rim to the wheel body.

7. A vehicle wheel comprising a wheel body, a double flanged ring secured to said body by means of one of said flanges, said flanges being angularly arranged relatively to each other, a rim associated with said ring, a disc web extending radially inwardly, a plurality of radially spaced flanges provided on said web, said flanges being positioned to receive the flanges carried by the wheel body therebetween, said flanges being so spaced that a wedging engagement is effected by the flanges carried by the rim and those carried by the wheel body and means for effecting such wedging engagement to detachably secure said rim to said wheel body.

8. A vehicle wheel comprising a wheel body, a double flanged ring secured to said body by means of one of said flanges, said flanges being angularly arranged relatively to each other, a rim associated with said ring, a disc web extending radially inwardly, a plurality of radially spaced flanges provided on said web, said flanges being positioned to receive the flanges carried by the wheel body therebetween, said flanges being so spaced that a wedging engagement is effected by the flanges carried by the rim and those carried by the wheel body, and means extending through said web, and said ring for detachably securing the rim to said wheel body.

9. In a vehicle wheel, the combination with a wheel body, of a rim, means permanently secured to and carrying said rim and providing a portion for fulcruming about said wheel body and a second portion for seating upon said wheel body, and means upon said wheel body providing for fulcruming of said first-mentioned portion.

10. In a vehicle wheel, the combination with a wheel body, of a rim, a ring permanently secured to and carrying said rim and provided with a portion for fulcruming about said wheel body and a second portion for seating upon said wheel body, and means upon said wheel body providing for fulcruming of said first-mentioned portion.

11. In a vehicle wheel, the combination with a wheel body having a shoulder and a flared seat radially outward relative to said shoulder, of a rim and a ring permanently secured to said rim and having a channel-shaped portion with a leg engageable with said shoulder and a flared leg engageable with said flared seat.

12. In a vehicle wheel, the combination with a wheel body having a shoulder and a seat, of a rim, and means for mounting said rim upon said wheel body including a channel-shaped member secured to said rim and having a leg adapted to fulcrum upon said shoulder and a second leg adapted to engage said seat.

13. In a vehicle wheel, the combination with a disk having a channel-shaped portion at its outer edge and a shoulder formed upon one of the legs of the channel-shaped portion, of a rim, and a substantially channel-shape ring having one of the legs thereof secured to said rim and seated upon the channel-shaped portion aforesaid of the disk, the other leg of said channel-shaped ring adapted to engage and fulcrum about said shoulder, the webs of the channel-shaped portions being spaced from each other, and securing means extending through the webs of said channel-shaped portions.

In testimony whereof I have hereunto signed my name.

LUDGER E. LA BRIE.